UNITED STATES PATENT OFFICE.

ADOLF BAEYER, OF MUNICH, BAVARIA, GERMANY, ASSIGNOR TO THE BADISCHE ANILIN AND SODA FABRIK, OF MANNHEIM, GERMANY.

MANUFACTURE OF ARTIFICIAL INDIGO.

SPECIFICATION forming part of Letters Patent No. 250,035, dated November 22, 1881.

Application filed July 21, 1881. (Specimens.)

*To all whom it may concern:*

Be it known that I, ADOLF BAEYER, a subject of the King of Bavaria, residing at Munich, in the Kingdom of Bavaria and Empire of Germany, have invented new and useful Improvements in the Manufacture of Artificial Indigo, of which the following is a specification.

This invention consists in the production of a new coloring-matter or dye-stuff, which I call "indogenic acid."

In carrying out my invention I take an ether compound of orthonitrophenylpropiolic acid—such as, for instance, the ethylic ether of the said acid—and I treat the same with a cold solution of an ammonium sulph-hydrate, until no further reaction is observed to take place, or until a sample of the insoluble portion of the product ceases to dissolve in concentrated sulphuric acid with an orange-red color. I then add a slight excess of muriatic acid, by which a precipitate is produced. This precipitate is filtered and washed and then exhausted by repeated treatment with a cold and dilute solution of caustic soda. The alkaline extract or solution thus obtained is acidified with muriatic acid, whereby indogenic ether is precipitated. In order to convert the said indogenic ether into indogenic acid, I treat the former with hot and concentrated caustic alkalies, in which treatment I proceed as follows: I take from three to five parts, by weight, of caustic soda, and add so much water that the mixture has a fusing-point of 160° to 180° centigrade. To this mixture I gradually add one part, by weight, of the indogenic ether, and keep the whole mass at a temperature of from 160° to 180° centigrade, stirring it well all the time until the fusing process is completed, or until no longer any alcoholic vapors are evolved. I then allow the mass to cool and introduce the same in small portions at a time into an excess of cold muriatic acid. In this manner a precipitate of indogenic acid is obtained which may be collected on a filter, washed and dried.

The characteristic properties of indogenic acid are the following: Indogenic acid is a crystalline solid. In the dry state, and at ordinary temperature, it is a stable compound. Heated above its fusing-point, or boiled with water, indogenic acid is decomposed into carbonic acid and indogen. It is not acted upon by highly-concentrated alkalies. When dissolved in a weak alkaline solution or exposed to ammoniacal vapors, it gets quickly oxidized and transformed into artificial indigo-blue by the action of the atmospheric air. Indogenic acid is also converted into artificial indigo-blue when submitted to the action of acid oxidizers, such as acid solutions of the perchlorides of iron or of copper, or of bichromate of potash.

What I claim as new, and desire to secure by Letters Patent, is—

1. As a new article of manufacture, the dyestuff or coloring-matter termed "indogenic acid," and having the characteristics above set forth.

2. The within-described process of producing indogenic ether by treating an ether compound of orthonitrophenylpropiolic acid with a reducing agent, such as ammonium sulph-hydrate, followed by the action of muriatic acid and a dilute solution of caustic soda.

3. The within-described process of producing indogenic acid by treating indogenic ether with caustic alkalies, and subsequently with muriatic acid, substantially as described.

In testimony whereof I have hereunto set my hand in the presence of two subscribing witnesses.

ADOLF BAEYER.

Witnesses:
PAUL FRIEDLAENDER,
WILHELM HAUSSMANN.